United States Patent [19]
Sawyer

[11] Patent Number: 5,901,145
[45] Date of Patent: May 4, 1999

[54] MOBILE STATION HANDOFF BETWEEN A SPREAD SPECTRUM COMMUNICATIONS SYSTEM AND A FREQUENCY DIVISION COMMUNICATIONS SYSTEM

[75] Inventor: Francois Sawyer, St-Hubert, Canada

[73] Assignee: Telefonaktiebolaget L M Ericsson (publ), Stockholm, Sweden

[21] Appl. No.: 08/808,305

[22] Filed: Feb. 28, 1997

[51] Int. Cl.$^6$ .................................................... H04Q 7/00
[52] U.S. Cl. ........................... 370/332; 370/331; 370/320
[58] Field of Search .................... 370/331, 320, 370/332, 335, 330, 344; 375/200; 455/436, 442

[56] References Cited

U.S. PATENT DOCUMENTS

| | | | |
|---|---|---|---|
| 5,267,261 | 11/1993 | Blakeney, II et al. ...................... | 375/1 |
| 5,313,489 | 5/1994 | Menich et al. ............................... | 375/1 |
| 5,345,467 | 9/1994 | Lomp et al. .................................. | 375/1 |

*Primary Examiner*—Jeffery A. Hofsass
*Assistant Examiner*—Mitchell Slavitt
*Attorney, Agent, or Firm*—Jenkens & Gilchrist

[57] ABSTRACT

An independent wideband pilot channel transmitter is located in each cell of a frequency division multiple access communications system which is adjacent to a code division multiple access communications system. Operation of the independent wideband pilot channel transmitter is controlled by a mobile switching center of the code division multiple access communications system. Wideband pilot channel broadcasts from the independent wideband pilot channel transmitters are then monitored by dual mode mobile stations in accordance with mobile assisted handoff (MAHO) procedures for the purpose of identifying target cells in the frequency division multiple access communications system which are suitable for handoff.

20 Claims, 2 Drawing Sheets

MOBILE STATION HANDOFF BETWEEN A SPREAD SPECTRUM COMMUNICATIONS SYSTEM AND A FREQUENCY DIVISION COMMUNICATIONS SYSTEM

BACKGROUND OF THE INVENTION

1. Technical Field of the Invention

The present invention relates to a dual mode communications system employing spread spectrum multiple access and frequency division multiple access techniques and, in particular, to the handoff of a mobile station between the spread spectrum portion of the system and the frequency division portion of the system.

2. Description of Related Art

Multiple access communications systems are well known in the art. The primary advantage of such communications systems is that many mobile stations may simultaneously engage in radio frequency communications while sharing common radio frequency spectrum resources. Two well known types of multiple access communications systems are narrowband (analog and/or digital) frequency division multiple access (FDMA) communications systems and wideband (digital) spread spectrum or code division multiple access (CDMA) communications systems.

Many kinds of frequency division multiple access communications systems are known in the art including: the analog Advanced Mobile Phone Service (AMPS); the digital Advanced Mobile Phone Service (D-AMPS); and the digital Global System for Mobile (GSM) communications. In a frequency division multiple access communications system, each cell operates with an assigned set of transmission frequencies. In an analog (i.e., non time division multiplexed) FDMA communications system, any given frequency comprises a channel. In a digital, time division multiplexed TDMA/FDMA communications system, however, each frequency is divided into a plurality of time slots which comprise the channels. The set of channels assigned to each cell includes at least one control channel (CCH) operable using FDMA or FDMA/TDMA multiplexing in digital mode, and a plurality of traffic (or voice) channels (TCHs) which operate in analog mode for analog systems and digital mode for digital systems. Sets of assigned channels are different for adjacent cells, and such sets are not repeated within the system except for cells that are far enough away from each other to minimize the likelihood of adjacent channel or co-channel interference.

The most widely recognized code division multiple access communications system known in the art is that system defined by TIA/EIA Interim Standard IS-95A. In a digital code division multiple access communications system, plural cells operate over the same frequency in a spread spectrum fashion. Digitized speech is multiplied by a pseudo-random code to "spread" the spectrum and provide the voice channels for subscriber communications. By pseudo-random it is meant that the multiplying data appears to be random but is in fact following a known direct sequence. The output signal is then mixed with the carrier frequency assigned to the cell and broadcast. To effectuate control over system operation, a control channel is also spread spectrum broadcast in each cell. For effectuating cell selection by the mobile stations, a pilot channel is also spread spectrum broadcast, with the cells distinguished from each other by the use of differing code phases for the pilot channel broadcasts.

As the system configuration and operation of both a conventional frequency division multiple access communications system and a conventional code division multiple access communications system are well known to those skilled in the art, detailed technical information need not be provided herein. However, technical information concerning these topics may be obtained by referring to a number of available documents. For example, for a description of the use of FDMA and TDMA/FDMA techniques in a multiple access communications system, reference is made to the text "Cellular Radio Systems", D. Balston, et al. (editors), Artech House, 1993. A number of known United States Patent provide a description of the use of CDMA techniques in multiple access communications systems.

In such multiple access communications systems, a handoff scheme of some sort is implemented to allow a call communication to continue in instances when a mobile station crosses the boundary between two cells. In one commonly used handoff scheme for analog systems, handoff is initiated when received signal strength in a given cell for a mobile station communication falls below a given threshold. The system then determines whether a neighboring cell can receive mobile station communications with a greater signal strength. If such a cell is identified, that cell is selected for the handoff. In another commonly used handoff scheme for digital systems, the mobile station additionally or alternatively makes downlink signal strength measurements with respect to the given cell and the control (pilot or reference) channels of its neighboring cells. These measurements are reported to the system for use in making the handoff determination and selecting the cell to which handoff occurs. In either of these schemes, the system informs the mobile station as to which cell is to be used in the future for continuing the call, and a corresponding re-routing of the call to that cell is made to coincide with a mobile station channel switch.

In conventional FDMA type cellular communications systems, each adjacent cell operates with a different set of radio frequencies. Accordingly, for each of the foregoing handoff schemes, the handoff must comprise a "hard" handoff. By this it is meant that the mobile station must change transceiver operation from a radio frequency used in and assigned to the current cell to a radio frequency used in and assigned to the new cell. Due to the limited functionalities of the transceiver for the mobile station, the mobile station must break its communication link with the currently serving cell before making the communication link with the newly serving cell.

In CDMA communications systems, however, the same frequency band can be used for many adjacent cells. Accordingly, for each of the foregoing handoff schemes, the handoff may comprise a "soft" handoff. By this it is meant that the mobile station need not necessarily change frequencies when switching communications from the current cell to the new cell. Communication with the mobile station is often simultaneously effectuated by two or more cells using the same frequency band, with the call switched between the two or more cells as measured signal strength dictates. When the signal strength measurements confirm a complete mobile station transition into the newly serving cell, communications utilizing the prior cell are discontinued.

As multiple access communications systems continue to be installed and upgraded, instances are sure to arise where one geographic area is provided service through a frequency division multiple access communications system, and an adjacent geographic area is provided service through a code division multiple access communications system. It may then become necessary to effectuate a handoff of a mobile station between the two systems. Such a handoff could only take place for mobile stations that are dual mode in nature such that they support both narrowband (FDMA) and wideband (CDMA) communications. As a practical matter, however, even assuming dual mode operation, certain technical limitations serve to preclude such a handoff. First, when a mobile station is communicating using the code division multiple access communications system, the base stations in the frequency division multiple access communications system cannot make signal strength measurements on the mobile station spread spectrum signal transmissions for the purpose of confirming handoff suitability. Furthermore, the frequency division multiple access communications system does not support the transmission of a pilot channel which a mobile station operating in spread spectrum mode must monitor for purposes of identifying target cells suitable for handoff.

Several solutions have been proposed to facilitate mobile station handoff between cells of a code division multiple access communications system and adjacent cells of a frequency division multiple access communications system. In a first solution, handoff is forced to a frequency division multiple access communications mode of operation when the mobile station moves within a ring of cells at the periphery of the code division multiple access communications system prior to handoff to the frequency division multiple access communications system. This solution is not favored because it wastes potential code division multiple access communications coverage area. In another solution, each frequency division multiple access communications system base station for cells positioned along the border with the code division multiple access communications system includes a wideband receiver for receiving spread spectrum mobile station communications for evaluation and processing by the frequency division multiple access communications system in making a handoff determination. Such a wideband receiver would necessarily have to be quite intelligent in order to receive and decode CDMA signals from mobile stations. This solution is accordingly not favored because of the added cost and complexity of supporting wideband receiver installation and operation.

SUMMARY OF THE INVENTION

To facilitate mobile station handoff between cells of a code division multiple access communications system and adjacent cells of a frequency division multiple access communications system, a wideband pilot channel transmitter is located in each border cell of the frequency division multiple access communications system. In one embodiment, the pilot channel transmitter advantageously utilizes the same transmission antenna utilized by the frequency division multiple access base station for that border cell. A communications link connects each pilot channel transmitter to a mobile switching center of the code division multiple access communications system for transmission of operation and maintenance messages. Mobile stations operating within the code division multiple access communications system in spread spectrum mode may then monitor the pilot channel broadcasts of the pilot channel transmitters for purposes of identifying target cells in the frequency division multiple access communications system suitable for handoff.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
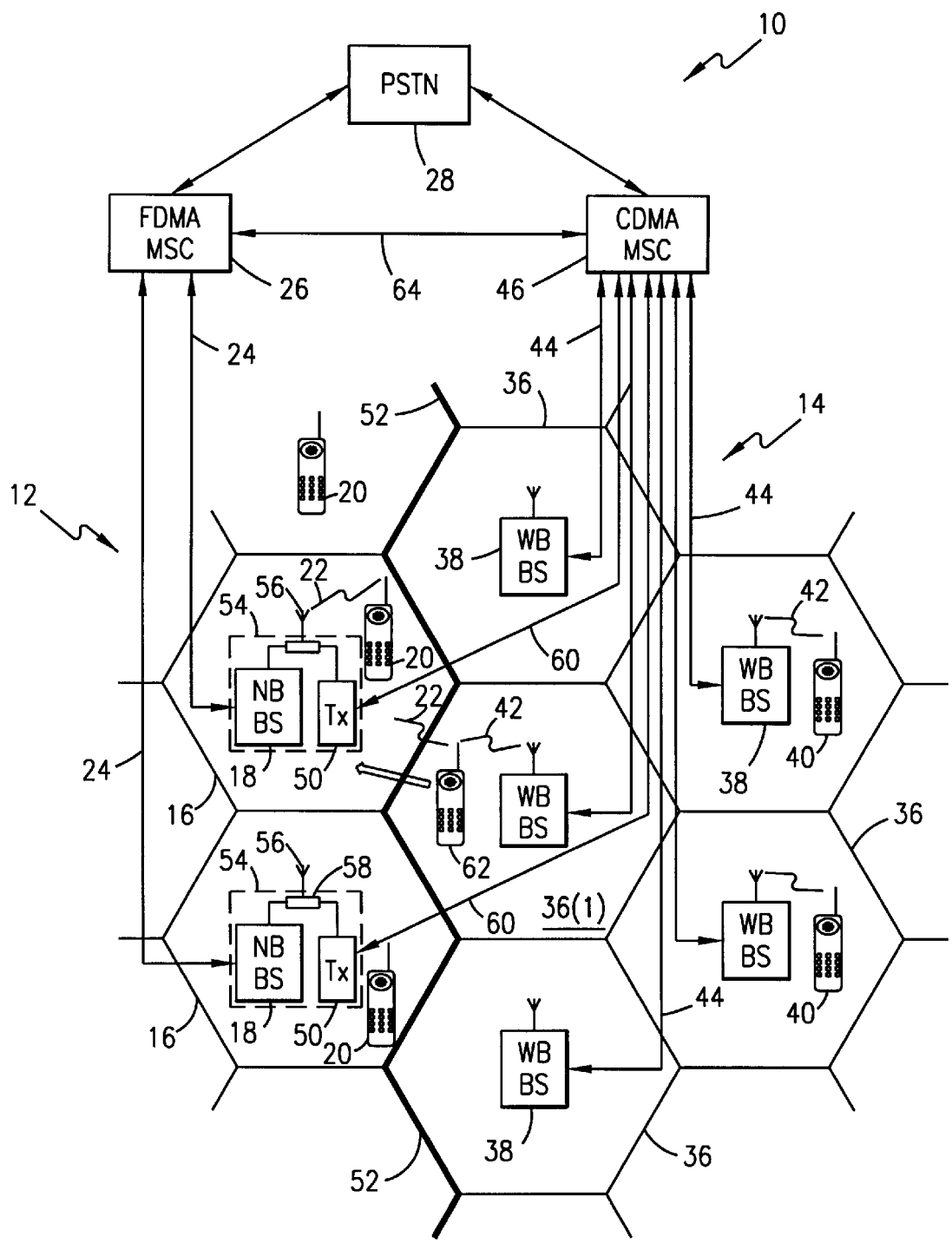
FIG. 1 is a schematic diagram of a multiple access communications system in accordance with the present invention including a frequency division multiple access (FDMA) communications portion and a code division multiple access (CDMA) communications system, along with independent wideband pilot channel transmitters located in border cells of the frequency division multiple access communications portion.

Reference is now made to FIG. 1 wherein there is shown a schematic diagram of a multiple access communications system 10 in accordance with the present invention including a frequency division multiple access (FDMA) communications portion 12 and a code division multiple access (CDMA) communications portion 14.

The frequency division multiple access communications portion 12 of the system 10 includes a plurality of cells 16. A base station (BS) 18 including one or more narrowband (NB) transceivers (not shown) is provided for each of the cells 16. Via the transceivers, the base stations 18 engage in simultaneous communications with plural mobile stations 20 operating within the area of the associated cell 16. These communications occur over a radio frequency air interface 22 supporting the use of both control channels and traffic (voice) channels. The base stations 18 further communicate via communications links 24 (including signaling links and voice trunks) with a central control station, commonly referred to as a mobile switching center (FDMA MSC) 26, which functions to control operation of the frequency division multiple access communications portion 12 of the system 10. The mobile switching center 26 is connected to other mobile switching centers (not shown) and/or to the public switched telephone network (PSTN) 28. In particular, the mobile switching center 26 operates to selectively connect subscriber voice and data communications to the mobile stations 20 through the base stations 18. Thus, the mobile switching center 26 controls system operation through and in response to the transmission of control signals carried by the control channels to set-up on the voice channels calls that are either originated by or terminated at the mobile stations 20. The mobile switching center 26 further controls, through and in response to control and traffic channel transmissions, the handoff of a subscriber communication from a voice channel of one cell 16 to a voice channel of another cell as the subscriber mobile station 20 travels throughout the service area of the frequency division multiple access communications portion 12 of the system 10 during an ongoing communication.

The code division multiple access communications portion 14 of the system 10 also includes a plurality of cells 36. A base station (BS) 38 including one or more wideband (WB) transceivers (not shown) is provided for each of the cells 36. Via the transceivers, the base stations 38 engage in simultaneous communications with plural mobile stations 40 operating within the area of the associated cell 36. These communications occur over a radio frequency air interface 42 supporting the use of control channels, pilot channels, synch channels and traffic (voice) channels. The base stations 38 further communicate via communications links 44 (including signaling links and voice trunks) with a central control station, commonly referred to as a mobile switching center (CDMA MSC) 46, which functions to control operation of the code division multiple access communications portion 14 of the system 10. The mobile switching center 46 is connected to other mobile switching centers (not shown) and/or to the public switched telephone network 28. In particular, the mobile switching center 46 operates to selectively connect subscriber voice and data communications to the mobile stations 40 through the base stations 38. Thus, the mobile switching center 46 controls system operation through and in response to the transmission of control signals carried by the control channels to set-up on the voice channels calls that are either originated by or terminated at the mobile stations 40. The mobile switching center 46 further controls, through and in response to control, pilot and traffic channel transmissions, the handoff of a subscriber communication from a voice channel of one cell 36 to a voice channel of another cell as the subscriber mobile station 40 travels throughout the service area of the code division multiple access communications portion 14 of the system 10 during an ongoing communication.

The system 10 further includes a wideband pilot channel transmitter (Tx) 50 for each cell 16 of the frequency division multiple access communications portion 12 located along border 52 adjacent to the code division multiple access communications portion 14. The wideband pilot channel transmitter 50 continuously transmits a wideband signal having a constant phase, and preferably operates independently of the base station 18 transceivers (not shown) for the frequency division multiple access communications portion 12. By "independently" it is meant that the wideband pilot channel transmitter 50 is not a part of, nor does it interact with, nor is it controlled by the base station 18, and further it is not directly connected to the mobile switching center 26 of the frequency division multiple access communications portion 12. The wideband pilot channel transmitter 50 may, however, be located within the same enclosure 54 protecting the base station 18 transceivers, and may further share the same broadcast antenna(s) 56 and power supplies while still remaining independent. If sharing of the antenna(s) 56 is necessary, this is accomplished through the use of an appropriate multicoupler 58. A signaling link 60 (for example, X.25) connects each of the wideband pilot channel transmitters 50 to the mobile switching center 46 of the code division multiple access communications portion 14. This link 60 carries general level operation and maintenance messages between the wideband pilot channel transmitter 50 and the mobile switching center 46. The messages from the mobile switching center 46 may comprise, for example, start and stop transmitting orders, pilot phase indications and power level settings. The messages from the wideband pilot channel transmitter 50 may comprise, for example, alarm reports regarding component failures.

Figure 2:
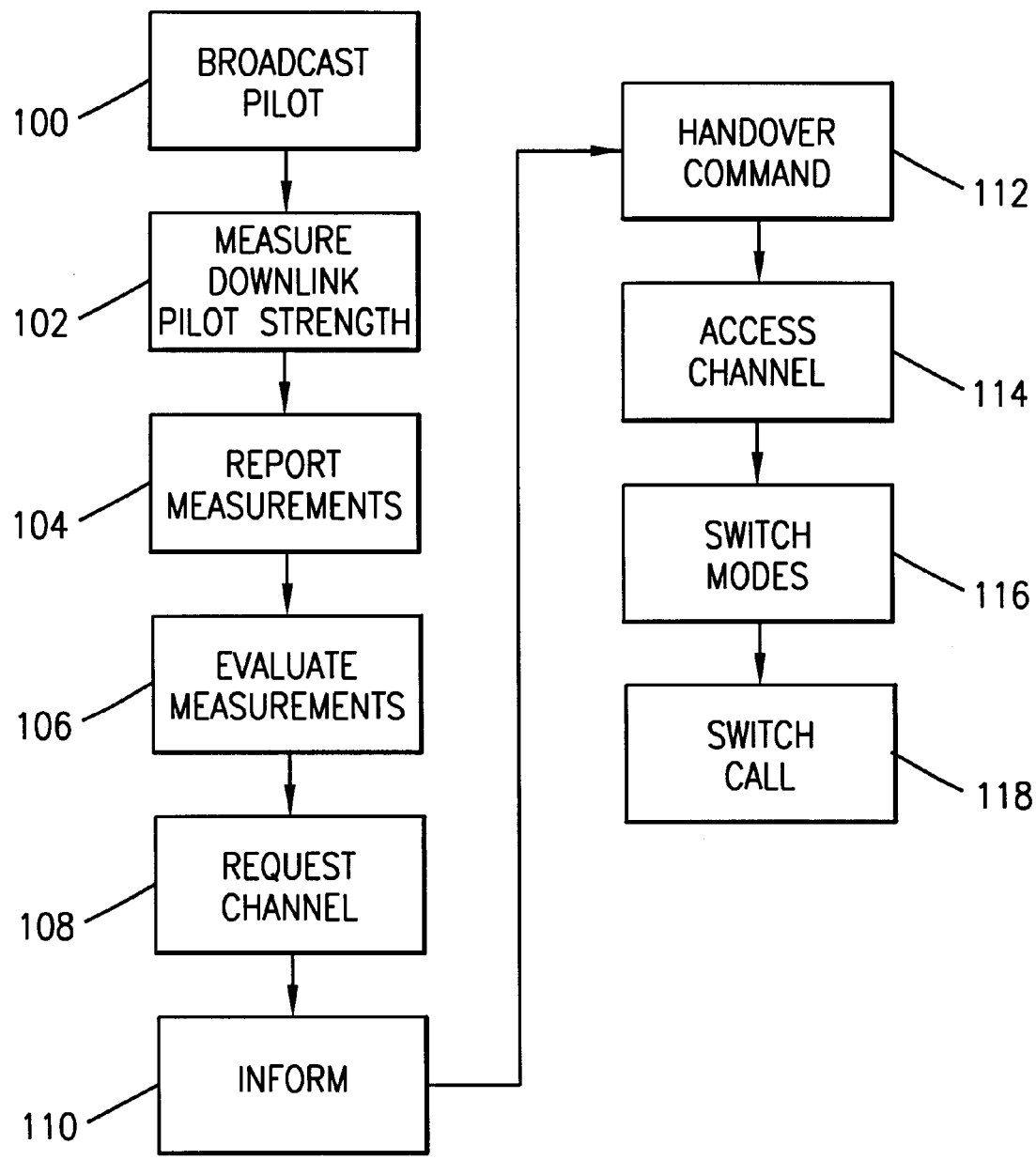
FIG. 2 is a flow diagram illustrating a handoff process used between the code division multiple access communications system and the frequency division multiple access communications system of FIG. 1.

Reference is now additionally made to FIG. 2 wherein there is shown a flow diagram of a handoff process for use in the system of FIG. 1. Use of the wideband pilot channel transmitters 50 facilitates handoff of communications with respect to dual mode (FDMA/CDMA) mobile stations 62 traveling across the border 52 from a cell 36 in the code division multiple access communications portion 14 to a cell 16 in the frequency division multiple access communications portion 12. Mobile switching center 46 controls wideband pilot channel transmitter 50 operation through signaling link 60 communications to broadcast a wideband pilot channel transmission having an appropriate phase (action 100). A dual mode mobile station 62 currently located within cell 36(1) adjacent border 52 is engaged in an ongoing call communication and is operating in spread spectrum mode.

In accordance with well known mobile assisted handoff (MAHO) procedures, the mobile station 62 measures the downlink signal strength of broadcasts from its serving base station 38 in cell 36(1) as well as the downlink signal strength of wideband pilot channel broadcasts from both the base stations 38 of neighboring cells in the code division multiple access communications portion 14 and the independent wideband pilot channel transmitters 50 located in neighboring cells 16 across the border 52 in the frequency division multiple access communications portion 12 (action 102). The mobile station made downlink signal strength measurements are reported back to the serving base station 38 in cell 36(1), and passed on to the CDMA mobile switching center 46 (action 104). These measurements are evaluated to determine whether a handoff is needed, and to which cell (the target) that handoff should preferably occur (action 106). If a determination is then made by the code division multiple access communications portion 14 that a handoff of the call communication should be made to a neighboring cell 16 across the border 52 in the frequency division multiple access communications portion 12, mobile switching center 46 contacts mobile switching center 26 (via the SS7 network 64 or the public switched telephone network 28, if necessary) using conventional TIA/EIA Interim Standard IS-41 inter-exchange handoff signaling, and request the assignment (and reservation) of a traffic channel for hand-off in the identified target cell 16 (action 108). That traffic channel is then seized, and both the base station 18 for the target cell 16, and the mobile switching center 46 of the code division multiple access portion 14 are informed of the channel assignment (action 110). The mobile switching center 46 then signals the mobile station 62 via the base station 38 for the currently serving cell 36(1) with a handover command directing the mobile station to switch to the assigned traffic channel in the target cell 16 (action 112). The mobile station 62 then tunes to and accesses the assigned traffic channel (action 114). It is noted that this requires the mobile station 62 to switch from spread spectrum mode of operation to narrowband mode of operation (action 116). When the base station 18 for the target cell 16 detects the mobile station access on the assigned traffic channel, the mobile switching centers 26 and 46 are informed. The call communication is then switched by mobile switching center 46 to mobile switching center 26 for further handling to complete the hand-off procedure (action 118).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A spread spectrum communications system, comprising:
   a first plurality of cells;
   a wideband radio frequency base station positioned in each of the first plurality of cells;
   a wideband mobile switching center connected to each of the wideband radio frequency base stations; and
   a plurality of wideband radio frequency transmitters for broadcasting a spread spectrum pilot channel, the wideband radio frequency transmitters connected to the wideband mobile switching center and positioned one each in each of a second plurality of cells, wherein the second plurality of cells are different from the first plurality of cells and are associated with a non-spread spectrum communications system.

2. The spread spectrum communications system as in claim 1 wherein the wideband mobile switching center operates to evaluate downlink signal strength measurements made and reported by mobile stations on the spread spectrum pilot channel broadcasts made by the wideband radio frequency transmitters for the purpose of identifying one of the second plurality of cells as a target cell for mobile station handoff.

3. The spread spectrum communications system as in claim 1 comprising a code division multiple access cellular communications system.

4. The spread spectrum communications system as in claim 1 wherein the non-spread spectrum communications system comprises a frequency division multiple access cellular communications system.

5. The spread spectrum communications system as in claim 4 wherein the frequency division multiple access cellular communications system comprises an Advanced Mobile Phone Service (AMPS) system.

6. The spread spectrum communications system as in claim 4 wherein the frequency division multiple access cellular communications system comprises a digital Advanced Mobile Phone Service (D-AMPS) system.

7. The spread spectrum communications system as in claim 4 wherein the frequency division multiple access cellular communications system comprises a Global System for Mobile (GSM) communications system.

8. A multi-mode cellular communications system, comprising:
   a first plurality of cells;
   a wideband radio frequency base station positioned in each of the first plurality of cells;
   a wideband mobile switching center connected to each of the wideband radio frequency base stations;
   a second plurality of cells different from the first plurality of cells;
   a narrowband radio frequency base station positioned in each of the second plurality of cells;
   a narrowband mobile switching center connected to each of the narrowband radio frequency base stations;
   means for connecting the wideband and narrowband mobile switching centers;
   a plurality of wideband radio frequency transmitters for broadcasting a spread spectrum pilot channel, the wideband radio frequency transmitters connected to the wideband mobile switching center and positioned one each in each of certain border ones of the second plurality of cells; and
   wherein the wideband mobile switching center operates to evaluate downlink signal strength measurements made and reported by mobile stations on the spread spectrum pilot channel broadcasts made by the wideband radio frequency transmitters for the purpose of identifying one of the border ones of the second plurality of cells as a target cell for mobile station handoff.

9. The multi-mode cellular communications system as in claim 8 wherein the wideband mobile switching center and wideband base stations implement a code division multiple access cellular communications system.

10. The multi-mode cellular communications system as in claim 8 wherein the narrowband mobile switching center and narrowband base stations implement a frequency division multiple access cellular communications system.

11. The multi-mode cellular communications system as in claim 10 wherein the frequency division multiple access cellular communications system comprises an Advanced Mobile Phone Service (AMPS) system.

12. The multi-mode cellular communications system as in claim 10 wherein the frequency division multiple access cellular communications system comprises a digital Advanced Mobile Phone Service (D-AMPS) system.

13. The multi-mode cellular communications system as in claim 10 wherein the frequency division multiple access cellular communications system comprises a Global System for Mobile (GSM) communications system.

14. A method for facilitating mobile station handoff from a cell in a spread spectrum communications system to a cell in a narrowband communications system, comprising the steps of:
   positioning a wideband radio frequency transmitter in the cell of the narrowband communications system;
   broadcasting a spread spectrum pilot channel transmission from the wideband radio frequency transmitter;
   measuring in the cell of the spread spectrum communications system at a mobile station a downlink signal strength of the broadcast spread spectrum pilot channel transmission from the cell of the narrowband communications system; and
   processing the measured downlink signal strength of the broadcast spread spectrum pilot channel transmission to determine whether the cell of the narrowband communications system is an acceptable target cell for mobile station handoff.

15. The method as in claim 14 wherein the spread spectrum communications system comprises a code division multiple access cellular communications system.

16. The method as in claim 14 wherein the narrowband communications system comprises a frequency division multiple access cellular communications system.

17. The method as in claim 16 wherein the frequency division multiple access cellular communications system comprises an Advanced Mobile Phone Service (AMPS) system.

18. The method as in claim 16 wherein the frequency division multiple access cellular communications system comprises a digital Advanced Mobile Phone Service (D-AMPS) system.

19. The method as in claim 16 wherein the frequency division multiple access cellular communications system comprises a Global System for Mobile (GSM) communications system.

20. The method as in claim 14 further comprising the steps of:
   communicating between the spread spectrum communications system and the narrowband communications system to assign a traffic channel in the cell of the narrowband communications system for handoff; and
   communicating between the spread spectrum communications system and the narrowband communications system to command a switch by the mobile station from a spread spectrum mode of operation to a narrowband mode of operation on the assigned traffic channel.

* * * * *